US008332357B1

(12) United States Patent
Chung

(10) Patent No.: US 8,332,357 B1
(45) Date of Patent: Dec. 11, 2012

(54) IDENTIFICATION OF MOVED OR RENAMED FILES IN FILE SYNCHRONIZATION

(75) Inventor: Richard Y. Chung, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/157,315

(22) Filed: Jun. 10, 2011

(51) Int. Cl.
*G06F 7/00* (2006.01)

(52) U.S. Cl. ...................................................... 707/634

(58) Field of Classification Search ........................ None
See application file for complete search history.

(56) References Cited

U.S. PATENT DOCUMENTS

| 7,085,779 | B2 | 8/2006 | Holtz et al. | |
|---|---|---|---|---|
| 7,127,477 | B2 | 10/2006 | Duncombe et al. | |
| 7,359,991 | B2 | 4/2008 | Balducci et al. | |
| 7,395,281 | B2 | 7/2008 | Edwards | |
| 7,464,117 | B2* | 12/2008 | Kaplan et al. ........................ | 1/1 |
| 7,577,998 | B1 | 8/2009 | Crosbie et al. | |
| 7,783,677 | B2 | 8/2010 | Li et al. | |
| 2002/0194205 | A1* | 12/2002 | Brown et al. ................. | 707/200 |
| 2005/0114363 | A1 | 5/2005 | Borthakur et al. | |
| 2006/0080308 | A1* | 4/2006 | Carpentier et al. ............... | 707/3 |
| 2007/0100834 | A1* | 5/2007 | Landry et al. ................... | 707/10 |
| 2008/0155122 | A1 | 6/2008 | Starbuck et al. | |
| 2009/0271447 | A1 | 10/2009 | Shin et al. | |
| 2011/0218964 | A1* | 9/2011 | Hagan et al. .................. | 707/626 |

OTHER PUBLICATIONS

Yan, et al., "Algorithms for Low-Latency Remote File Synchronization", Retrieved at <<http://cis.poly.edu/suel/papers/recon.pdf>>, IEEE 27th Conference on Computer Communications, Apr. 13-18, 2008, pp. 9.

* cited by examiner

*Primary Examiner* — Neveen Abel Jalil
*Assistant Examiner* — Tyler Torgrimson
(74) *Attorney, Agent, or Firm* — L. Alan Collins; Collins & Collins Intellectual, LLC

(57) ABSTRACT

A method for synchronizing files is provided. Current metadata including a filename and a hash identifier for each file of the synchronized folder is created. The current metadata is compared to previous metadata. Based on the comparison, a first file and a first folder added to the synchronized folder and a second file and a second folder deleted from the synchronized folder are identified. The hash identifiers of the first and second files are compared. If the hash identifiers match, the filenames of the first and second files are compared. If the filenames do not match, the first file is identified as a renamed file. Metadata is sent to a synchronized device with information related to the first folder sent before information related to the first file, which is sent before information related to the second folder.

18 Claims, 8 Drawing Sheets

IDENTIFICATION OF MOVED OR RENAMED FILES IN FILE SYNCHRONIZATION

BACKGROUND

Computerized file systems are used to store and organize electronic data. A synchronizing application may enable an electronic object such as a file of any type stored in a computerized file system to be shared and updated among multiple computing devices or endpoints that are remote from each other. A shared file is stored on the multiple computing devices or endpoints that are remote from each other. Remote in this context means separate devices. The synchronizing application may monitor shared files for updates to any of the files being shared at any of the computing devices and synchronize the shared files to maintain consistency between the shared files across each of the multiple computing devices.

The shared files can be hierarchically organized, for example, using a file folder system where each folder can contain files and/or other folders. The folder can be referred to as a synchronized folder because it contains a hierarchy of files and folders that are shared across the multiple computing devices and for which synchronization is maintained. The hierarchy of files and folders is also shared across the multiple computing devices. After initial setup, the synchronized folder exists at each of the multiple computing devices and changes to the synchronized folder and any files it contains at any of the multiple computing devices results in a corresponding and consistent change at the other computing devices. Thus, multiple copies or instances of the synchronized folder exist, each located on a different computing device. When a change is made to any of the instances of the synchronized folder, the change is reflected to each of the other copies/instances at the other computing devices so that after synchronization the instances are identical.

When using an instance of the file system at any of the remote computing devices, users may reorganize the file system structure and hierarchy by renaming files and folders, moving files into different folders, deleting or adding files and folders. The user may also edit existing files. When a file or folder within the synchronized folder is updated at any of the synchronized file systems, the update and/or the updated file is replicated to the other synchronized file systems under control of the synchronizing application that may be executing at each computing device. Some synchronizing applications monitor shared files for updates to any of the files being shared so that synchronization can be performed automatically. When synchronizing the changes made by the user at a first remote computing device, the synchronizing application executing at a different computing device generally replicates the modification by deleting from the different computing device old versions of files and folders that correspond to the modified files and folders on the first computing device and recreating the modified files and folders on the different computing device to match the first computing device based on information sent from the remote computing device either directly or indirectly to the different computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an illustrative embodiment, a method for identifying a file as a renamed file is provided. Metadata is created to describe a synchronized folder in its current state. The synchronized folder includes a plurality of files that are replicated at a second computing device. The current metadata includes a filename and a hash identifier for each file of the plurality of files. The hash identifier is created based on the contents of a respective file of the plurality of files. The created current metadata is compared to previous metadata created for the synchronized folder. Based on the comparison, a first file added to the synchronized folder after creation of the previous metadata is identified. Based on the comparison, a second file deleted from the synchronized folder after creation of the previous metadata is identified. The hash identifier of the identified first file is compared to the hash identifier of the identified second file. If the hash identifier of the identified first file matches the hash identifier of the identified second file, the filename of the identified first file is compared to the filename of the identified second file. The first file is identified as a renamed file if the filename of the identified first file does not match the filename of the identified second file.

In another illustrative embodiment, a computer-readable storage medium is provided having stored thereon computer-readable instructions that when executed by a computing device, cause the computing device to perform the method of identifying a file as a renamed file.

In yet another illustrative embodiment, a device is provided. The device includes, but is not limited to, a processor and the computer-readable storage medium operably coupled to the processor. The computer-readable storage medium has instructions stored thereon that when executed by the processor, cause the device to perform the method of identifying a file as a renamed file.

In still another illustrative embodiment, a method for synchronizing files is provided. The synchronized folder also includes a plurality of folders that are replicated at the second computing device. A first file is identified as a renamed file in the synchronized folder. A first folder is identified as added to the synchronized folder. A second folder is identified as deleted from the synchronized folder. First metadata associated with the identified first folder is sent to a third computing device. The first metadata includes a first folder name of the identified first folder. After sending the first metadata, second metadata associated with the identified first file is sent to the third computing device. The second metadata includes a first filename of the identified first file and an identifier to identify the renamed file to the third computing device. After sending the second metadata, third metadata associated with the identified second folder is sent to the third computing device. The third metadata includes a second folder name of the identified second folder.

In another illustrative embodiment, a computer-readable storage medium is provided having stored thereon computer-readable instructions that when executed by a computing device, cause the computing device to perform the method of synchronizing files.

In yet another illustrative embodiment, a device is provided. The device includes, but is not limited to, a processor and the computer-readable storage medium operably coupled to the processor. The computer-readable storage medium has instructions stored thereon that when executed by the processor, cause the device to perform the method of synchronizing files.

Other principal features and advantages of the invention will become apparent to those skilled in the art upon review of the following drawings, the Detailed Description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

The present application describes a file synchronization system 100. File synchronization system 100 detects moves and renames of files and/or folders using hash identifier created for each file of a file system to identify the file. A file that has been renamed or moved anywhere within a synchronized folder is encoded into the metadata such that any synchronizing endpoint can move the file without retransmission of the data. To avoid deleting and re-creating the file or its metadata at the synchronizing endpoint, the conventional steps of transmitting file changes may be reordered from 1) Delete Files, 2) Delete Folders, 3) Create Folders, and 4) Create Files to 1) Delete Files, 2) Create Folders, 3) Move/Renamed Files, 4) Delete Folders, and 5) Create Files.

Figure 1:
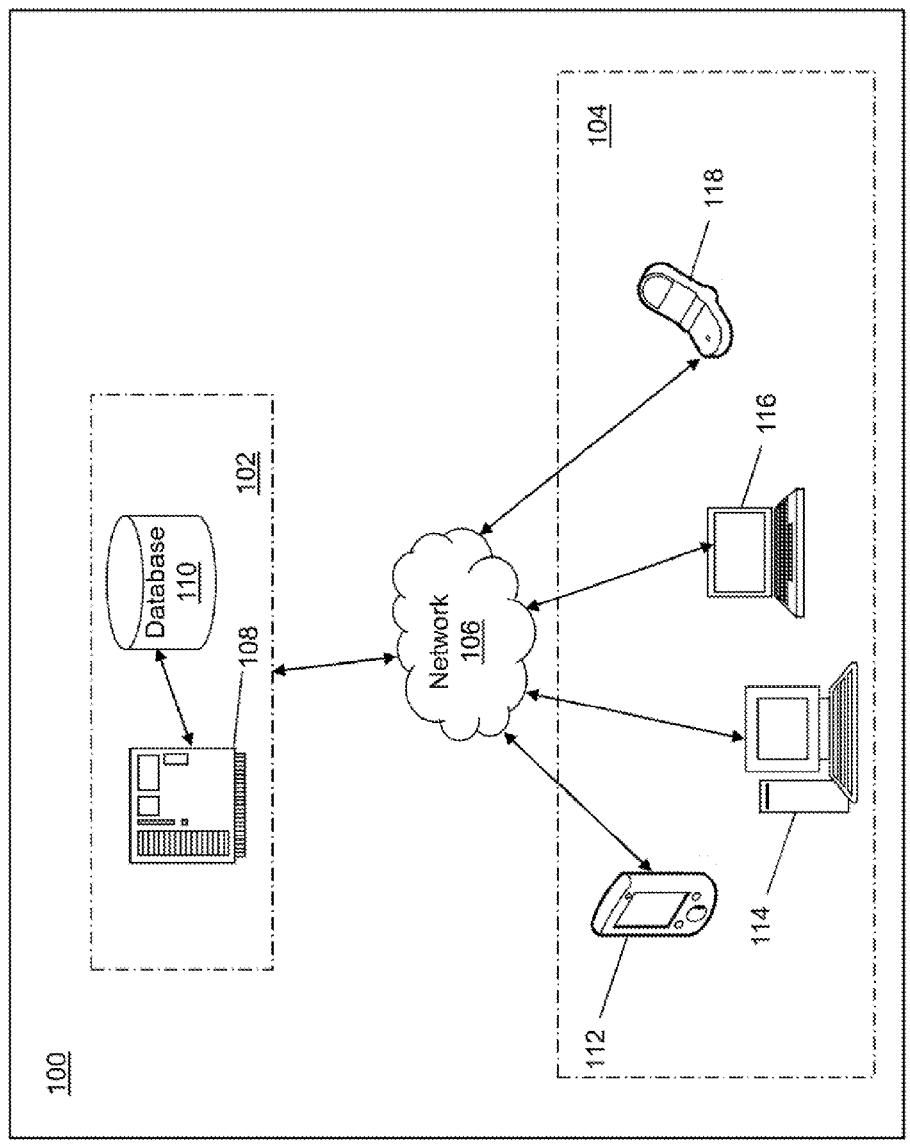
FIG. 1 depicts a block diagram of a file synchronization system in accordance with an illustrative embodiment.

With reference to FIG. 1, a block diagram of file synchronization system 100 is shown in accordance with an illustrative embodiment. File synchronization system 100 may include a server system 102, a plurality of endpoint devices 104, and a network 106. Network 106 may include one or more networks of the same or different types. Network 106 can be any type of wired and/or wireless public or private network including a cellular network, a local area network, a wide area network such as the Internet, etc. Network 106 further may be comprised of sub-networks and include any number of devices. The components of file synchronization system 100 may be positioned in a single location, a single facility, and/or may be remote from one another. One or more of the components of file synchronization system 100 may be connected directly, for example, using a cable for transmitting information between systems.

Server system 102 may include a server computing device 108 and a database 110. Server computing device 108 may be a computer of any form factor. Server system 102 further may include a plurality of server computing devices that may be connected directly or through network 106. Server computing device 108 includes or can access database 110 either through a direct connection or through network 106. Additionally, database 110 may be integrated with server computing device 108.

Database 110 is a data repository for file synchronization system 100. Database 110 may include a plurality of databases that may be organized into multiple database tiers to improve data management and access. Database 110 may utilize various database technologies and a variety of different formats as known to those skilled in the art including a file system, a relational database, a system of tables, a structured query language database, etc. Database 110 may be implemented as a single database or as multiple databases stored in different storage locations distributed over the Internet or other heterogeneous storage infrastructures.

The plurality of endpoint devices 104 may include one or more computing devices. The one or more computing devices send and receive signals through network 106 to/from another of the one or more computing devices and/or to/from server system 102. The plurality of endpoint devices 104 can include any number and type of computing devices that may be organized into subnets or a peer-to-peer (P2P) network. The one or more computing devices may include computers of any form factor such as a personal digital assistant 112, a desktop 114, a laptop 116, an integrated messaging device, a cellular telephone 118, a smart phone, a pager, etc. The plurality of endpoint devices 104 may include additional types of devices.

The plurality of endpoint devices 104 communicate using various transmission media that may be wired or wireless as known to those skilled in the art. The plurality of endpoint devices 104 may communicate information as peers in a peer-to-peer network using network 106. Users may use a computing device of the plurality of endpoint devices 104 to interact with the file system of the computing device and to send and to receive information related to the file system status so that at least a portion of the file system is replicated at another of the plurality of endpoint devices 104.

Figure 2:
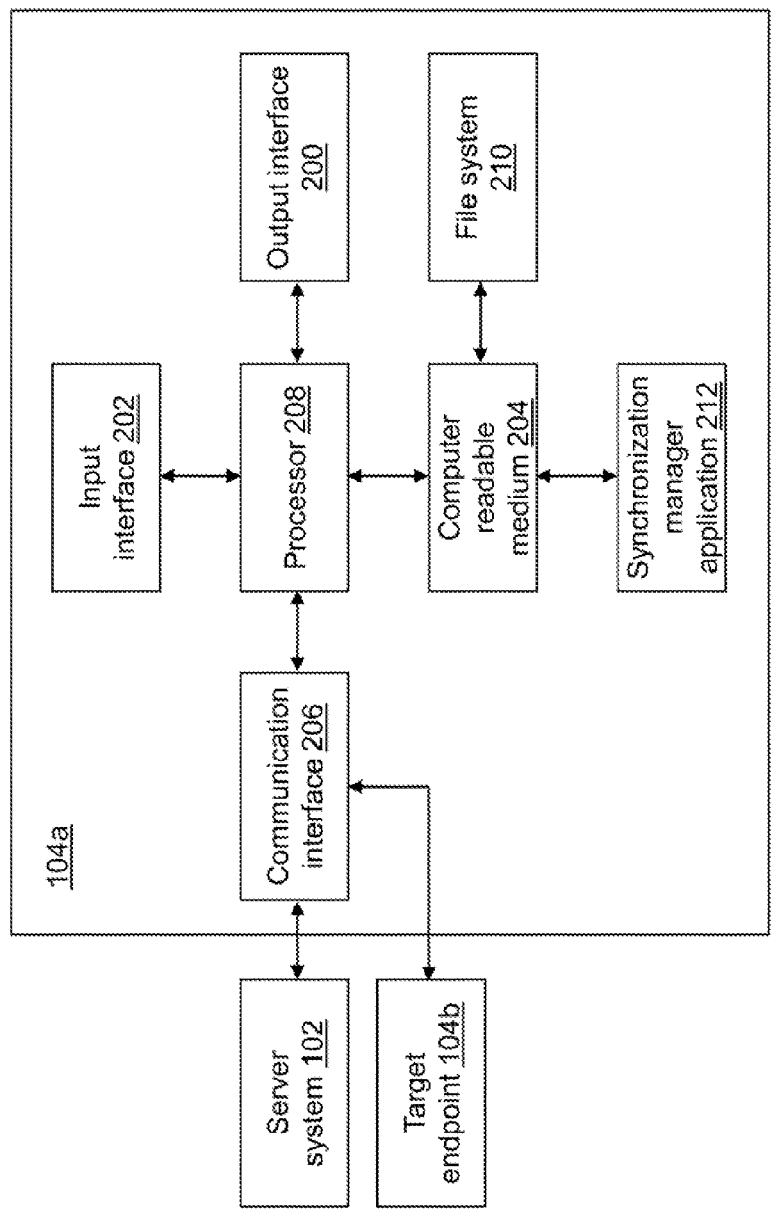
FIG. 2 depicts a block diagram of a source endpoint device of the file synchronization system of FIG. 1 in accordance with an illustrative embodiment.

With reference to FIG. 2, a block diagram of a source endpoint device 104a of file synchronization system 100 is shown in accordance with an illustrative embodiment. Source endpoint device 104a is an example computing device of the plurality of endpoint devices 104. Source endpoint device 104a of file synchronization system 100 may communicate with server system 102 and/or a target endpoint device 104b. Target endpoint device 104b is an example computing device of the plurality of endpoint devices 104. An endpoint device of the plurality of endpoint devices 104 may be both a source endpoint device 104a and a target endpoint device 104b dependent upon from which device the file system is being synchronized. Source endpoint device 104a further may communicate with a plurality of target endpoint devices.

Source endpoint device 104a may include an output interface 200, an input interface 202, a computer-readable storage medium 204, a communication interface 206, a processor 208, a file system 210, and a synchronization manager application 212. Different and additional components may be incorporated into source endpoint device 104a as well as target endpoint device 104b.

Output interface 200 provides an interface for outputting information for review by a user of source endpoint device 104a. For example, output interface 200 may include an interface to a display, a speaker, a printer, etc. The display may be a thin film transistor display, a light emitting diode display, a liquid crystal display, or any of a variety of different displays known to those skilled in the art. The speaker may be any of a variety of speakers as known to those skilled in the art. The printer may be any of a variety of printers as known to those skilled in the art. Source endpoint device 104a may have one or more output interfaces that use the same or a different interface technology. The display, speaker, and/or printer further may be accessible to source endpoint device 104a through communication interface 206.

Input interface 202 provides an interface for receiving information from the user for entry into source endpoint device 104a as known to those skilled in the art. Input interface 202 may use various input technologies including, but not limited to, a keyboard, a pen and touch screen, a mouse, a track ball, a touch screen, a keypad, one or more buttons, etc. to allow the user to enter information into source endpoint device 104a or to make selections presented in a user interface displayed on the display. The same interface may support both input interface 202 and output interface 200. For example, a touch screen both allows user input and presents output to the user. Source endpoint device 104a may have one or more input interfaces that use the same or a different input interface technology.

Computer-readable storage medium 204 is an electronic holding place or storage for information so that the information can be accessed by processor 208 as known to those skilled in the art. Computer-readable storage medium 204 can include, but is not limited to, any type of random access memory (RAM), any type of read only memory (ROM), any type of flash memory, etc. such as magnetic storage devices (e.g., hard disk, floppy disk, magnetic strips, . . . ), optical discs (e.g., CD, DVD, . . . ), smart cards, flash memory devices, etc. Source endpoint device 104a may have one or more computer-readable media that use the same or a different memory media technology. Source endpoint device 104a also may have one or more drives that support the loading of a memory media such as a CD or DVD.

Communication interface 206 provides an interface for receiving and transmitting data between devices using various protocols, transmission technologies, and media as known to those skilled in the art. Communication interface 206 may support communication using various transmission media that may be wired or wireless. Source endpoint device 104a may have one or more communication interfaces that use the same or a different communication interface technology. Data and messages may be transferred between source endpoint device 104a and server system 102 and/or target endpoint device 104b using communication interface 206.

Processor 208 executes instructions in a manner known to those skilled in the art. The instructions may be carried out by a special purpose computer, logic circuits, or hardware circuits. Thus, processor 208 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 208 executes an instruction, meaning that it performs/controls the operations called for by that instruction. Processor 208 operably couples with output interface 200, with input interface 202, with computer-readable storage medium 204, and with communication interface 206 to receive, to send, and to process information. Processor 208 may retrieve a set of instructions from a permanent memory device and copy the instructions in an executable form to a temporary memory device that is generally some form of RAM. Source endpoint device 104a may include a plurality of processors that use the same or a different processing technology.

Figure 5:
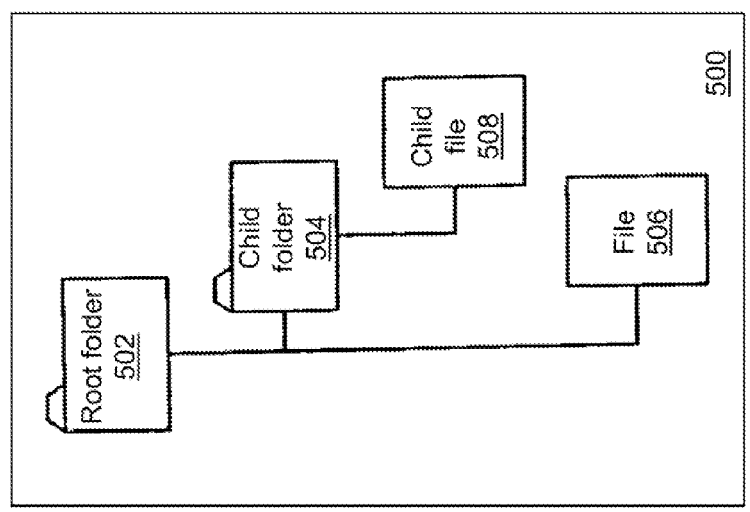
FIG. 5 depicts a file system of the source endpoint device of FIG. 2 in accordance with an illustrative embodiment.

With reference to FIG. 5, a file tree 500 is shown in accordance with an illustrative embodiment. File tree 500 provides a graphical display of the organization of file system 210 and depicts both files and folders. File system 210 is an electronic method for storing and organizing electronic data on a computing device. File system 210 may contain thousands (or even hundreds of thousands) of files and folders. Thus, file system 210 can include an unlimited number of files and folders. File system 210 maintains a record of the physical location of the files stored in computer-readable storage medium 204 so that the files may be manipulated and retrieved under control of the operating system executed by processor 208. As understood by a person of skill in the art, the files may be stored in computer-readable storage medium 204 in contiguous clusters or blocks or in noncontiguous clusters or blocks. File system 210 keeps track of the clusters or blocks of computer-readable storage medium 204 used to store each file. Numerous file systems have been developed and may vary based on the type of computing device and the operating system(s) installed on the computing device.

File system 210, represented by file tree 500, may include a root folder 502, a child folder 504, and a file 506. A folder, also known as a directory, is a virtual container in which groups of computer files and other folders can be kept and organized. Thus, files can be organized by storing related files in the same folder. Although folders and directories are explicitly disclosed, example embodiments can be applied with any hierarchical data or file structure. A folder contained inside another folder is called a subfolder or subdirectory or child folder of that folder. Together, the folders form a hierarchy, or tree structure such as that represented by file tree 500. Of course, root folder 502 may include any number of child folders and files. In the example of FIG. 5, child folder 504 includes a child file 508. Similar to root folder 502, child folder 504 may include any number of child folders and child files. In turn, each child folder of child folder 504 may include any number of child folders and child files. File tree 500 represents the logical storage of files though not necessarily the physical storage of the files in computer-readable storage medium 204.

With continuing reference to FIG. 2, associated with each file of file system 210 is the electronic data that comprises the file contents as well as data that describes characteristics of the file. For example, file characteristics may include a filename, a file type, a creation date and time, an edit date and time, a file size, and a parent folder name identifying the name of the folder in which the file is logically stored. Similarly, folder characteristics may include a folder name, a creation date and time, an edit date and time, a folder size, and a parent folder name identifying the name of the folder in which the folder is logically stored. The "file type" for a folder may be used to distinguish a folder from a file. For example, a folder may be assigned a "file type" of "directory" to easily distinguish a folder from a file. Of course, additional information may be associated with each file and folder dependent on the type of file system.

Synchronization manager application 212 performs operations associated with maintaining synchronization between at least a portion of file system 210 stored at source endpoint device 104a and at least a portion of the file system stored at target endpoint device 104b. Some or all of the operations described herein may be embodied in synchronization manager application 212. The operations may be implemented using hardware, firmware, software, or any combination of these methods. With reference to the illustrative embodiment of FIG. 2, synchronization manager application 212 is implemented in software (comprised of computer-readable and/or computer-executable instructions) stored in computer-readable storage medium 204 and accessible by processor 208 for execution of the instructions that embody the operations of synchronization manager application 212. Synchronization manager application 212 may be written using one or more programming languages, assembly languages, scripting languages, etc. Synchronization manager application 212 may be implemented as a plug-in or be otherwise integrated with another application supporting additional functionality between endpoint devices.

Synchronization manager application 212 may be implemented as a Web application executing, for example, at source endpoint device 104a and/or server system 102. For example, synchronization manager application 212 may be configured to receive and to send hypertext transport protocol (HTTP) messages along with optional additional data content which may include web pages such as hypertext markup language (HTML) documents and linked objects from/to server system 102 and/or target endpoint device 104b.

Synchronization manager application 212 further may provide information or data organized in the form of a website accessible over network 106. A website may comprise multiple Web pages that display a specific set of information and may contain hyperlinks to other Web pages with related or additional information. Each web page is identified by a uniform resource locator (URL) that includes the location or address of the computing device that contains the resource to be accessed in addition to the location of the resource on that computing device. The type of file or resource depends on an Internet application protocol. For example, HTTP and HTTP secure (HTTPS) describe a Web page to be accessed with a browser application. The file accessed may be a simple text file, an image file, an audio file, a video file, an executable, a common gateway interface application, a Java applet, or any other type of file supported by HTTP.

The browser application performs operations associated with retrieving, presenting, and traversing information resources provided by a Web application and/or Web server as known to those skilled in the art. An information resource is identified by a uniform resource identifier (URI) and may be a Web page, image, video, or other piece of content. Hyperlinks in resources enable users to navigate to related resources. Illustrative browser applications include Internet Explorer® by Microsoft Corporation, Navigator by Netscape Communications Corporation, Firefox® by Mozilla Corporation, Opera by Opera Software Corporation, Safari by Apple Inc., Chrome by Google Inc., etc. as known to those skilled in the art. Synchronization manager application 212 may be integrated with a browser application executing at source endpoint device 104a.

Figure 3:
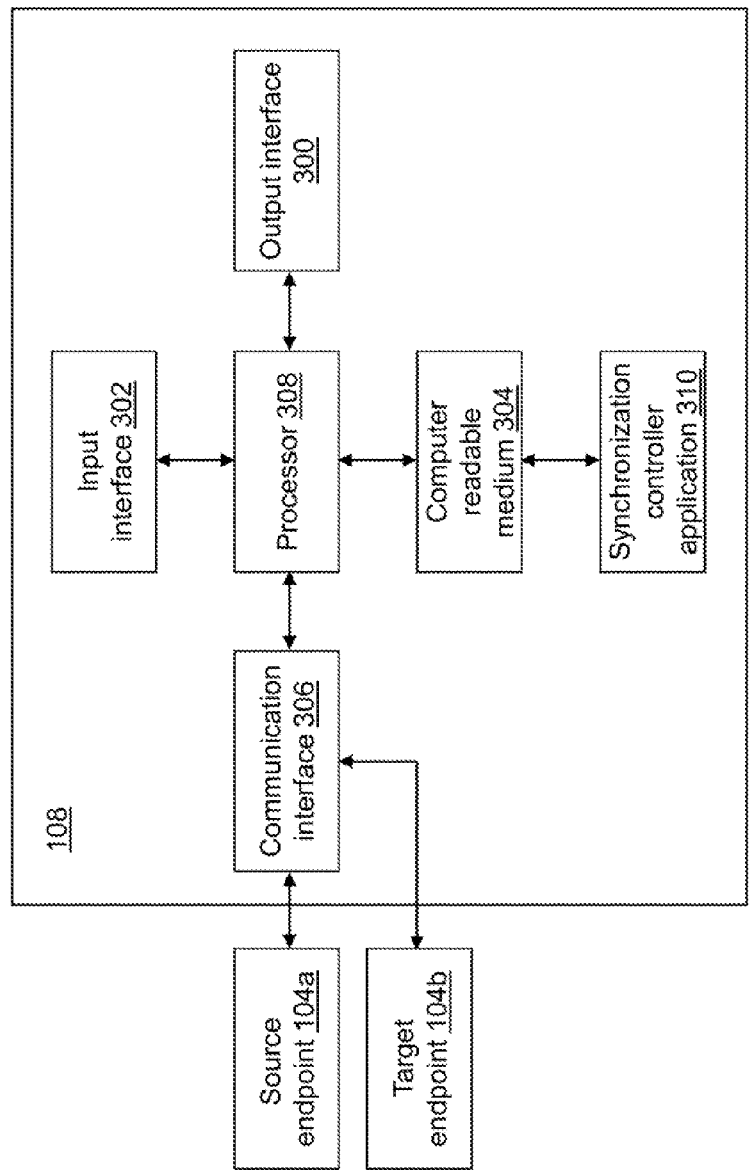
FIG. 3 depicts a block diagram of a server computing device of the file synchronization system of FIG. 1 in accordance with an illustrative embodiment.

With reference to FIG. 3, a block diagram of server computing device 108 of file synchronization system 100 is shown in accordance with an illustrative embodiment. Server computing device 108 may include a second output interface 300, a second input interface 302, a second computer-readable storage medium 304, a second communication interface 306, a second processor 308, and a synchronization controller application 310. Different and additional components may be incorporated into server computing device 108.

Second output interface 300 provides the same or similar functionality as that described with reference to output interface 200 of source endpoint device 104a. Second input interface 302 provides the same or similar functionality as that described with reference to input interface 202 of source endpoint device 104a. Second computer-readable storage medium 304 provides the same or similar functionality as that described with reference to computer-readable storage medium 204 of source endpoint device 104a. Second computer-readable storage medium 304 may provide the electronic storage medium for database 110. Second communication interface 306 provides the same or similar functionality as that described with reference to communication interface 206 of source endpoint device 104a. Second communication interface 306 may provide connectivity with database 110 as well as with source endpoint device 104a and/or with target endpoint device 104b. Second processor 308 provides the same or similar functionality as that described with reference to processor 208 of source endpoint device 104a.

Synchronization controller application 310 performs operations associated with controlling synchronization between at least a portion of file system 210 stored at source endpoint device 104a and at least a portion of the file system stored at target endpoint device 104b. Some or all of the operations described herein may be embodied in synchronization controller application 310. The operations may be implemented using hardware, firmware, software, or any combination of these methods. With reference to the illustrative embodiment of FIG. 3, synchronization controller application 310 is implemented in software (comprised of computer-readable and/or computer-executable instructions) stored in second computer-readable storage medium 304 and accessible by second processor 308 for execution of the instructions that embody the operations of synchronization controller application 310. Synchronization controller application 310 may be written using one or more programming languages, assembly languages, scripting languages, etc.

Synchronization controller application 310 and synchronization manager application 212 may be the same or different applications or part of an integrated, distributed application supporting some or all of the same or complementary functionality as described herein. Synchronization controller application 310 may be a Web application that communicates with synchronization manager application 212 executing at source endpoint device 104a and/or target endpoint device 104b.

Figure 4:
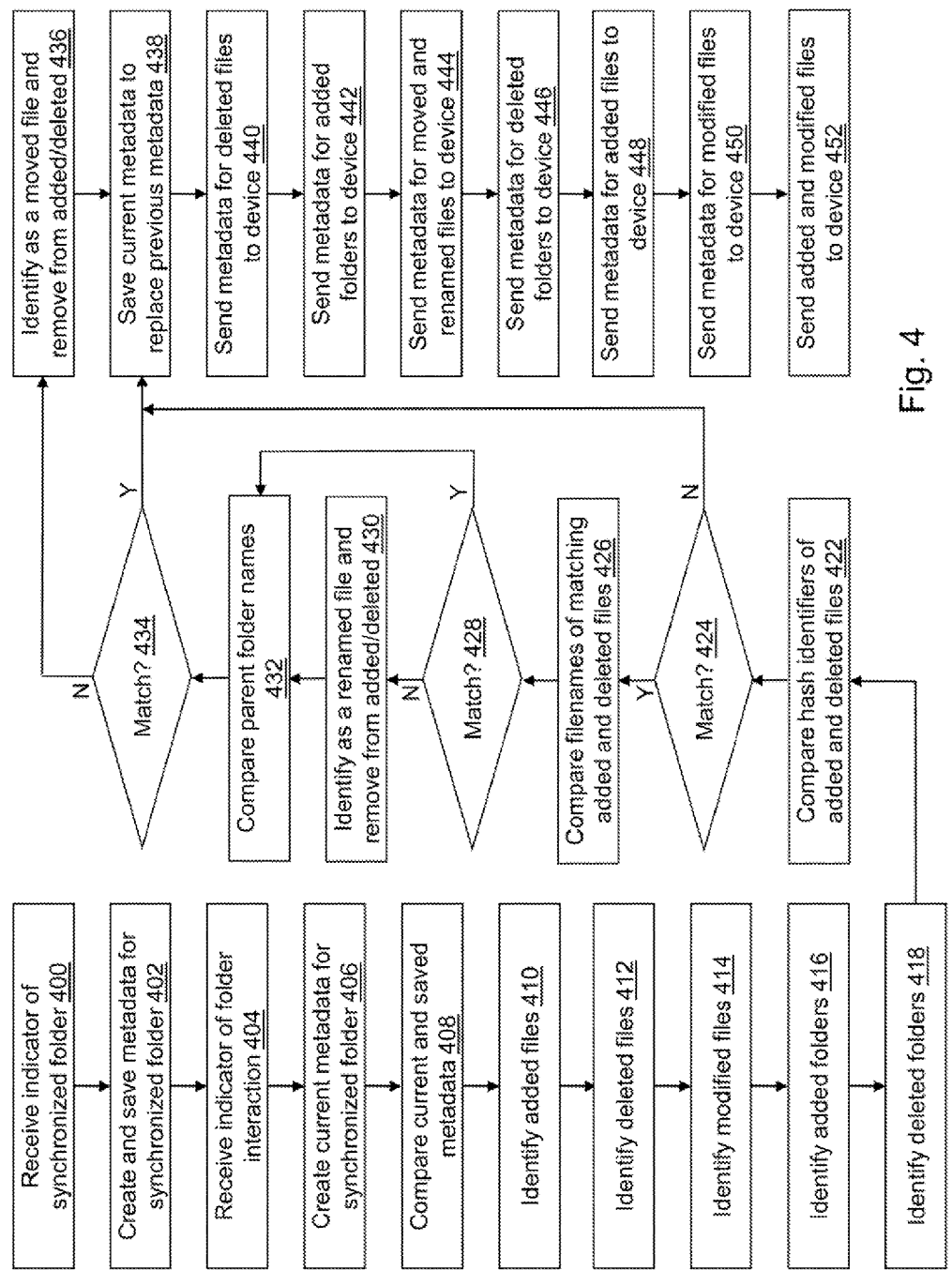
FIG. 4 depicts a flow diagram illustrating example operations performed through use of a synchronization manager application of the source endpoint device of FIG. 2 in accordance with an illustrative embodiment.

With reference to FIG. 4, illustrative operations associated with synchronization manager application 212 executing at source endpoint device 104a are described. Additional, fewer, or different operations may be performed depending on the embodiment. The order of presentation of the operations of FIG. 4 is not intended to be limiting. Thus, although some of the operational flows are presented in sequence, the various operations may be performed in various repetitions, concurrently, and/or in other orders than those that are illustrated. Additionally, though the operations are indicated as discrete, multiple operations may be implemented as a single operation. Thus, the operations are provided to illustrate the functionality provided by synchronization manager application 212 and are not necessarily associated directly with specific computer-readable or computer-executable instructions.

A user may install and execute synchronization manager application 212 on an endpoint device such as source endpoint device 104a and/or target endpoint device 104b. Synchronization manager application 212 may provide a mechanism through which the user may select or otherwise identify a folder within file system 210 to synchronize at any number of endpoint devices of the plurality of endpoint devices 104. For example, the user may execute synchronization manager application 212 which causes presentation of a user interface window, which may include a plurality of menus and selectors such as drop down menus, buttons, text boxes, hyperlinks, etc. The user may browse within file tree 500 to select a synchronized folder and one or more endpoint device at which the synchronized folder is to be replicated. Thus, an "endpoint device" is any device in network 106 that contains a copy of data that is synchronized to another device in the network. A "source" endpoint device is a device at which a modification is made to the synchronized folder. A "target" endpoint device is a device at which the modification at the source endpoint device is replicated.

In an operation 400, a synchronized folder indicator is received based on the user selection/identification. The synchronized folder indicator identifies the synchronized folder within file system 210 of source endpoint device 104a. For example, the synchronized folder indicator may include alphanumeric text and symbols that identify the folder name of the synchronized folder and the location of the synchronized folder within file system 210. As an example, the user may have specified root folder 502 or child folder 504 or any other child folder of root folder 502 as the synchronized folder. The synchronized folder is a folder that may include a plurality of files and/or a plurality of folders that is replicated at a plurality of computing devices including source endpoint device 104a and target endpoint device 104b. The synchronized folder includes the entire hierarchy of files and folders logically stored within the synchronized folder. Information sufficient to create a replication of the synchronized folder at target endpoint device 104b (or any other identified endpoint device of the plurality of endpoint devices) is sent to target endpoint device 104b. The information may include the filename of each file within the synchronized folder, the folder name of the folder in which each file is stored, and the content of each file within the synchronized folder.

In an operation 402, metadata is created and saved which describes each file system entity (file/folder) of the synchronized folder. For example, the synchronized folder may be scanned by executing an operating system command such as "ls" in the UNIX operating system or "dir" in the DOS operating system to create a listing of the files and the folders hierarchically stored in the synchronized folder as understood by a person of skill in the art. In an example embodiment, execution of the scan, execution of the scan of the synchronized folder recursively scans each child folder of the synchronized folder to identify the files and folders within each folder thereby defining file tree 500 with the synchronized folder as root folder 502. The metadata may be created by each endpoint device at which the synchronized folder is replicated or the metadata may be created at source endpoint device 104a and sent to the other endpoint devices.

Thus, the file system entities of the synchronized folder include all of the child folders and files logically stored under the synchronized folder within file system 210. The metadata includes the data that is used to synchronize endpoint devices such as source endpoint device 104a and target endpoint device 104b and may be saved in a file stored in computer-readable storage medium 204. The metadata may include a file/folder type, a file/folder name, a parent folder name, a hash identifier, a file/folder size, a creation date, an edit date, etc. The metadata may be stored in a metadata file using a variety of digital formats such as a format defined using the extensible markup language (XML). The metadata file may or may not be stored in a human readable format.

The metadata file may include the file/folder type, the file/folder name, the parent folder name, the hash identifier, the file/folder size, the creation date, the edit date, etc. for each file system entity included within the synchronized folder. The file/folder type indicates if the file system entity is a file or a folder. If the file system entity is a file, the file/folder type indicates what type of content is stored in the file as known to a person of skill in the art. The file/folder name is the symbolic name associated with the file system entity. The parent folder name is the symbolic name associated with the folder in which the file system entity is stored within the synchronized folder.

The hash identifier may be calculated for each file system entity using a variety of cryptographic hash functions as understood by a person of skill in the art. The hash identifier may be calculable regardless of the file type as text, binary, mixed, etc. The hash identifier is an output value obtained by applying the hash function to the contents of the file and/or possibly stream or metadata associated with the file. A hash function is a mathematical function that converts a possibly large and variable-sized amount of data into a small datum such as a single integer. For example, the hash identifier may be an MD5 or a SHA output value calculated using an MD5 or SHA hash function applied to the contents of the file. The hash function determines a hash value for each unique file based on the file contents and/or possibly stream or metadata associated with the file. Though not necessarily guaranteed to be unique, the hash function may be used as if it was unique for each unique file. Thus, files having the same content have the same value for the hash identifier.

In an operation 404, an indicator indicating an interaction with a file system entity of the synchronized folder is received. For example, the interaction may include a user of source endpoint device 104a deleting a file or folder within the synchronized folder, creating a new file or folder within the synchronized folder, editing a file or folder within the synchronized folder, moving or renaming a file or folder within the synchronized folder, etc. The indicator may be a notification or event created by file system 210. The indicator may be triggered as a result of a periodic scan of the synchronized folder, by a user requesting a synchronization between endpoint devices through interaction with synchronization manager application 212, by a File System Watcher application such as that described in U.S. Patent Publication No. 2009/0210454, by using a file system journaling method, where every interaction with file system 210 is logged into a file system log, and can be read back by an application on demand, etc.

In an operation 406, the synchronized folder is recursively scanned and current metadata is created that describes the current state of the synchronized folder. In an operation 408, the current metadata is compared to the metadata saved in operation 402. Based on the comparison, any added files are identified in an operation 410. For example, any file having a filename that is included in the current metadata and not in the previous metadata may be identified as an added file. Based on the comparison, any deleted files are identified in an operation 412. For example, any file having a filename that is included in the previous metadata and not in the current metadata may be identified as a deleted file. Based on the comparison, any modified files are identified in an operation 414. For example, any file having the same filename in the current metadata and in the previous metadata, but a different value for the hash identifier may be identified as a modified file. Based on the comparison, any added folders are identified in an operation 416. For example, any folder having a folder name that is included in the current metadata and not in the previous metadata may be identified as an added folder. Based on the comparison, any deleted folders are identified in an operation 418. For example, any folder having a folder name that is included in the previous metadata and not in the current metadata may be identified as a deleted folder. Operations 410-418 may be performed in any order.

In an operation 422, the hash identifier associated with each of the identified added files is compared to the hash identifier associated with each of the identified deleted files. Of course, the same hash function was used to calculate each hash identifier. In an operation 424, a determination is made for any of the hash identifiers that match between the identified added files and the identified deleted files. If no hash identifiers match between the identified added files and the identified deleted files, processing continues at an operation 438. For those files for which the hash identifiers match, processing continues at an operation 426 to determine if the files are renamed and/or moved files.

In operation 426, the filenames of the added file and the deleted file having matching hash identifiers are compared. In an operation 428, a determination is made concerning whether or not the filenames match. If the filenames match, processing continues at an operation 432. If the filenames do not match, processing continues at an operation 430. In operation 430, information associated with the file is added to a list of renamed files and the file is identified as a renamed file. The information may include the new or current filename of the file identified as an added file, the previous filename of the file identified as a deleted file, and the hash identifier. The information may be stored in any type of data structure. Thus, the term list is not used herein to reference a specific type of data structure. Files identified as renamed are removed from the list of added and deleted files.

In operation 432, the parent folder name of the added file and the deleted file having matching hash identifiers are compared. In an operation 434, a determination is made concerning whether or not the parent folder names match. If the parent folder names match, processing continues at operation 438. If the parent folder names do not match, processing continues at an operation 436. In operation 436, information associated with the file is added to a list of moved files and the file is identified as a moved file. The information may include the new or current parent folder name of the file identified as an added file, the previous parent folder name of the file identified as a deleted file, and the hash identifier. The list of renamed files and moved files may be the same list and may include the new filename of the file identified as an added file, the previous filename of the file identified as a deleted file, the new parent folder name of the file identified as an added file, the previous parent folder name of the file identified as a deleted file, and the hash identifier. Files identified as moved are removed from the list of added and deleted files. The list of renamed files and moved files may or may not include the previous filename of the file identified as a deleted file or the previous parent folder name of the file identified as a deleted file. Instead, server system 102 and/or target endpoint device 104b may determine the matching file using the hash identifier locally.

Operations 426-436 are performed for each file that has a matching hash identifier in the identified added files and the identified deleted files. When each file having matching hash identifiers has been processed, processing continues at operation 438. Operations 426, 428, and 430 may be performed either before or after operations 432, 434, and 436.

Folder moves and renames can be accomplished in a similar manner as file moves and renames by identifying a "matching" folder from the identified deleted folders and the identified added folder. A "matching" folder can be identified, for example, based on a determination that all of the child folders and files of the identified deleted folders and the identified added folder have the same name. As another example, a "matching" folder can be identified based on a determination that a predefined percentage of the child folders and files of the identified deleted folders and the identified added folder have the same name.

In operation 438, the current metadata created in operation 406 is saved in the metadata file and replaces the metadata created in operation 402 for subsequent comparisons initiated by receipt of a subsequent indicator indicating an interaction with a file system entity of the synchronized folder received in operation 404.

In operations 440-452, one or more subsets of the created current metadata are communicated to a second device. For example, the one or more subsets may be communicated to server system 102 (server computing device 108 or database 110 directly) and/or target endpoint device 104b, which was previously identified as a device including a folder synchronized with the synchronized folder of source endpoint device 104a. As an example, the one or more subsets may be communicated to server computing device 108 using an HTTP POST message. As another example, server computing device 108 and/or target endpoint device 104b may retrieve the one or more subsets from a location known to each device periodically or when notified of a change associated with the synchronized folder. The metadata associated with files which have not been edited, renamed, added, deleted, or moved may not be communicated to the second device to reduce the amount of data transferred between devices. Operations 440-452 may be performed in any order.

The order in which the one or more subsets of the created current metadata in operations 440-452 are communicated to the second device may be specified to reduce the transfer of data associated with files that have not changed and to allow the files to be moved or renamed in place on server system 102 and/or target endpoint device 104b. Thus, as an example, in an operation 440, metadata associated with deleted files identified within the synchronized folder is first sent to the second device. The metadata associated with deleted files may include a filename for each of the deleted files.

In an operation 442, metadata associated with added folders identified within the synchronized folder is sent to the second device after performing operation 440. The metadata associated with added folders may include a folder name for each of the added folders. In an operation 444, metadata associated with the files identified as moved and/or renamed in operations 430 and 436 is sent to the second device after performing operation 442. The metadata associated with the files identified as moved and/or renamed may include a filename, a parent folder name, and a hash identifier for each of the moved and/or renamed files.

In an operation 446, metadata associated with deleted folders identified within the synchronized folder is sent to the second device after performing operation 444. The metadata associated with deleted folders may include a folder name for each of the deleted folders. Though operations 442-446 may be performed in any order, by sending the metadata associated with added folders (operation 442) before the metadata associated with the files identified as moved and/or renamed (operation 444) and by sending the metadata associated with the files identified as moved and/or renamed (operation 444) before the metadata associated with deleted folders (operation 446), the moves and renames of files can be performed in place within the synchronized folder at target endpoint device 104b and/or server system 102, without using a "backup" or temporary folder created on file system 210 of target endpoint device 104b to temporarily hold the files while the new folders are created.

In an operation 448, metadata associated with added files identified within the synchronized folder is sent to the second device after performing operation 446. The metadata associated with added files may include a filename, a parent folder name, and a hash identifier for each of the moved and/or added files. In an operation 450, metadata associated with modified files identified within the synchronized folder is sent to the second device after performing operation 448. The metadata associated with modified files may include a filename, a parent folder name, and a hash identifier for each of the modified files.

In operation 452, the added and modified files are sent to the second device. In an alternative embodiment, the added file content may be sent with the metadata associated with the added files in operation 448. The modified file content may be sent with the metadata associated with the modified files in operation 450. The added and modified files may be sent to the second device automatically or when requested by the second device. In an alternative embodiment where server system 102 is the second device, the added and modified files may not be sent to the second device. Instead, target endpoint device 104b may request the added and modified files from source endpoint device 104a after receiving the metadata from server system 102.

Figure 6:
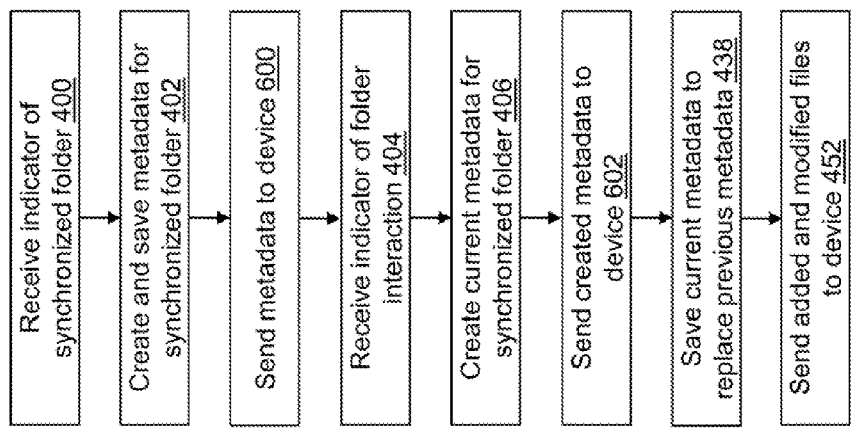
FIG. 6 depicts a flow diagram illustrating example operations performed through use of the synchronization manager application of the source endpoint device of FIG. 2 in accordance with a second illustrative embodiment.

With reference to FIG. 6, illustrative operations associated with synchronization manager application 212 executing at source endpoint device 104a are described in accordance with a second illustrative embodiment. Synchronization manager application 212 may be designed to vary at which endpoint device some of the processing is performed. Thus, with reference to the illustrative embodiment of FIG. 4 in contrast to the second illustrative embodiment of FIG. 6, less processing is performed at source endpoint device 104a in the second illustrative embodiment of FIG. 6. Additional, fewer, or different operations may be performed depending on the embodiment. The order of presentation of the operations of FIG. 6 is not intended to be limiting. Thus, although some of the operational flows are presented in sequence, the various operations may be performed in various repetitions, concurrently, and/or in other orders than those that are illustrated. Additionally, though the operations are indicated as discrete, multiple operations may be implemented as a single operation. Thus, the operations are provided to illustrate the functionality provided by synchronization manager application 212 and are not necessarily associated directly with specific computer-readable or computer-executable instructions.

In the second illustrative embodiment, operations 400 and 402 are performed to create the metadata for the synchronized folder. In an operation 600, the created metadata is sent to the second device. Operations 404 and 406 are performed to create current metadata for the synchronized folder after an interaction with the synchronized folder. For example, the interaction may include a user of source endpoint device 104a deleting a file or folder within the synchronized folder, creating a new file or folder within the synchronized folder, editing a file or folder within the synchronized folder, moving or renaming a file or folder within the synchronized folder, etc. In an operation 602, the created current metadata is sent to the second device. Operation 438 is performed to replace the metadata created in operation 402 with the current metadata created in operation 406 for subsequent comparisons initiated by receipt of a subsequent indicator indicating another interaction with a file system entity of the synchronized folder received in operation 404. Operation 452 is performed to send the added and modified files to either server system 102 or target endpoint device 104b.

Figure 7:
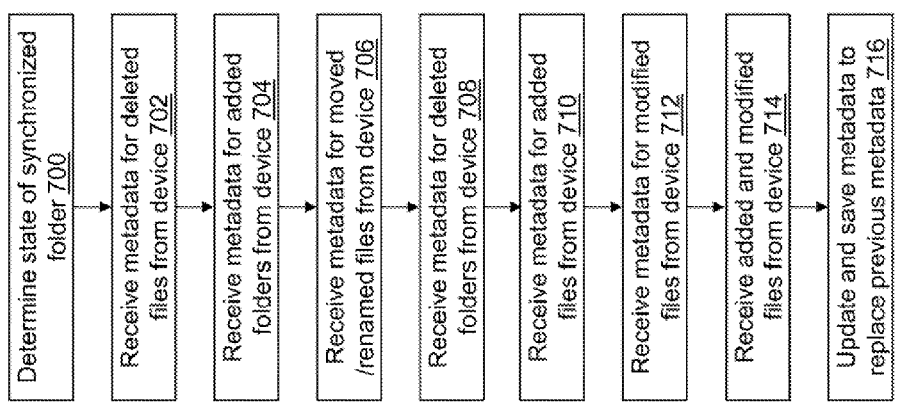
FIG. 7 depicts a flow diagram illustrating example operations performed through use of the synchronization manager application of a target endpoint device of the file synchronization system of FIG. 1 in accordance with an illustrative embodiment.

With reference to FIG. 7, illustrative operations associated with synchronization manager application 212 executing at target endpoint device 104b are described. The illustrative operations of FIG. 7 also may be associated with synchronization controller application 310 executing at server computing device 108. Additional, fewer, or different operations may be performed depending on the embodiment. The operations performed by synchronization manager application 212 executing at source endpoint device 104a and synchronization manager application 212 executing at target endpoint device 104b may be integrated in a single application or segmented into two or more different applications. The order of presentation of the operations of FIG. 7 is not intended to be limiting. Thus, although some of the operational flows are presented in sequence, the various operations may be performed in various repetitions, concurrently, and/or in other orders than those that are illustrated. Additionally, though the operations are indicated as discrete, multiple operations may be implemented as a single operation. Thus, the operations are provided to illustrate the functionality provided by synchronization manager application 212 and are not necessarily associated directly with specific computer-readable or computer-executable instructions.

In an operation 700, a synchronization state of the synchronized folder is determined. The synchronization state may indicate if the synchronized folder has or has not been changed on an endpoint of the plurality of endpoint devices 104. For example, a user of target endpoint device 104b may request the synchronization state from server system 102 or from source endpoint device 104a. As an example and in response to the request, target endpoint device 104b may send an HTTP GET request to server computing device 108. As another option, target endpoint device 104b may periodically request the synchronization state from server system 102 or from source endpoint device 104a without user action. As yet another option, server system 102 or source endpoint device 104a may automatically send a notification to target endpoint device 104b that the synchronization state has changed. Thus, target endpoint device 104b need not affirmatively determine the synchronization state of the synchronized folder before receiving metadata related to a change in the synchronization state of the synchronized folder at source endpoint device 104a.

In an operation 702, metadata associated with deleted files identified within the synchronized folder, if any, is received by target endpoint device 104b from either server system 102 or from source endpoint device 104a. The corresponding local files are deleted in the synchronized folder stored on target endpoint device 104b using the metadata.

In an operation 704, metadata associated with added folders identified within the synchronized folder, if any, is received by target endpoint device 104b. Corresponding folders are created in the synchronized folder stored on target endpoint device 104b.

In an operation 706, metadata associated with the files identified as moved and/or renamed is received by target endpoint device 104b. The corresponding local files are moved and/or renamed in the synchronized folder stored on target endpoint device 104b.

In an operation 708, metadata associated with deleted folders identified within the synchronized folder, if any, is received by target endpoint device 104b. The corresponding local folders are deleted in the synchronized folder stored on target endpoint device 104b.

In an operation 710, metadata associated with added files, if any, is received by target endpoint device 104b. Corresponding local files are created in the synchronized folder stored on target endpoint device 104b. In an operation 712, metadata associated with modified files identified within the synchronized folder, if any, is received by target endpoint device 104b. In operation 714, the added and modified files, if any, are received by target endpoint device 104b and the associated file data is stored locally.

In operation 716, the metadata stored on target endpoint device 104b is updated based on the metadata received in operations 702-712. The updated metadata is saved in the metadata file and replaces the previous metadata and may be used for subsequent comparisons at target endpoint device 104b to determine any changes associated with the synchronized folder as described for operation 406 of FIG. 4.

Operations 702-714 may be performed in any order. However, by performing "folder adds" (operation 704) before "file moves and renames" (operation 706) and by performing "file moves and renames" (operation 706) before "folder deletes" (operation 708), the moves and renames of files can be performed in place within the synchronized folder at target endpoint device 104b, without using a "backup" or temporary folder created on the file system to temporarily hold the files while the new folders are created.

Figure 8:
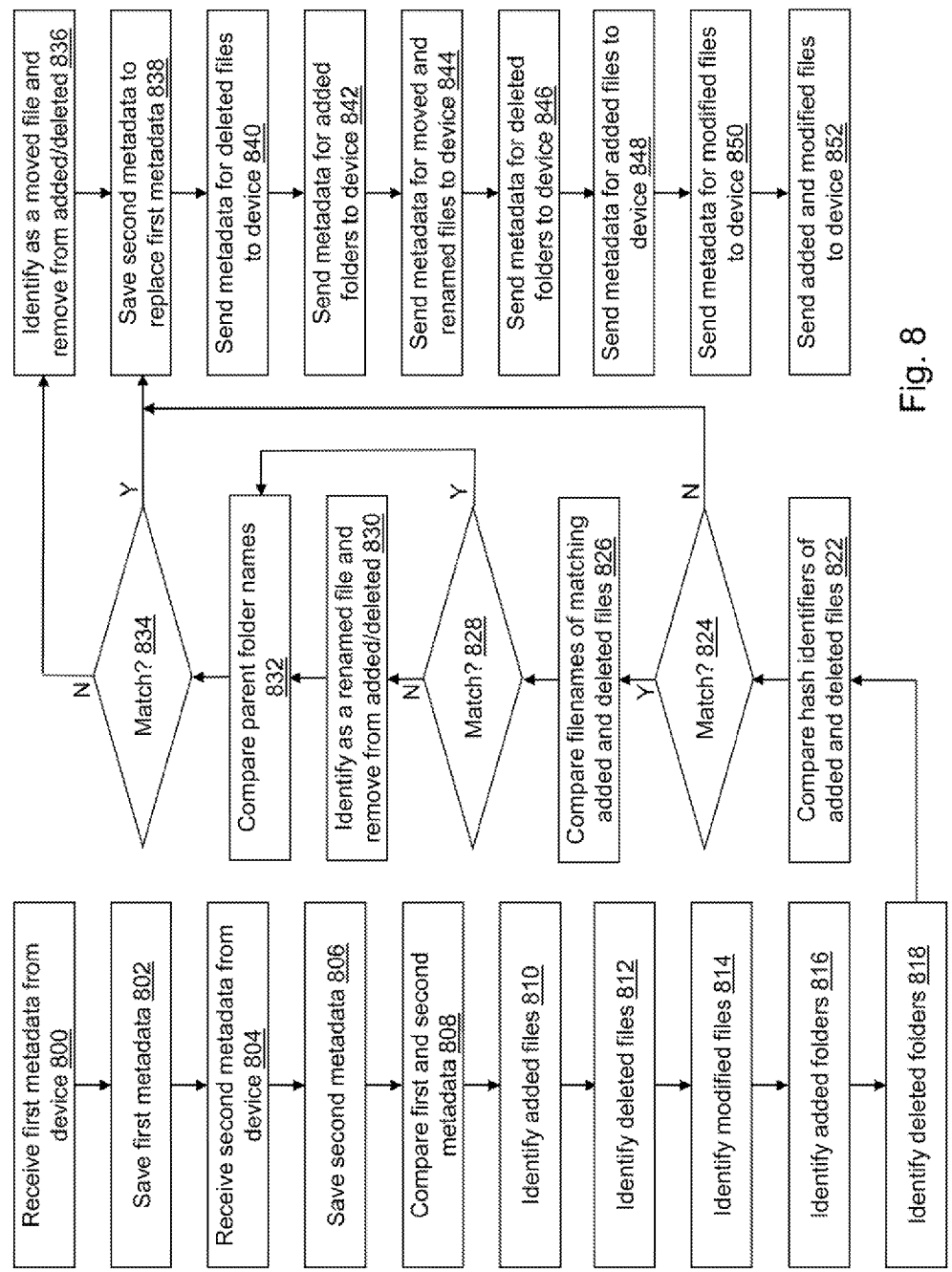
FIG. 8 depicts a flow diagram illustrating example operations performed through use of a synchronization controller application of the server computing device of FIG. 3 in accordance with an illustrative embodiment.

With reference to FIG. 8, illustrative operations associated with synchronization controller application 310 executing at server computing device 108 are described. Dependent on how much processing is performed at source endpoint device 104a, server computing device 108 will perform the additional operations not performed by source endpoint device 104a. Additional, fewer, or different operations may be performed depending on the embodiment. The order of presentation of the operations of FIG. 8 is not intended to be limiting. Thus, although some of the operational flows are presented in sequence, the various operations may be performed in various repetitions, concurrently, and/or in other orders than those that are illustrated. Additionally, though the operations are indicated as discrete, multiple operations may be implemented as a single operation. Thus, the operations are provided to illustrate the functionality provided by synchronization manager application 212 and are not necessarily associated directly with specific computer-readable or computer-executable instructions.

In an operation 800, first metadata is received for the synchronized folder from an initiating endpoint device of the plurality of endpoint devices 104 by server computing device 108. The first metadata may include an endpoint device indicator that identifies one or more endpoint devices at which the synchronized folder is replicated. For example, the endpoint device indicator may include an Internet Protocol Address for the one or more endpoint devices. The first metadata includes sufficient information to replicate the hierarchy of files and folders defined within the synchronized folder such as filenames, folder names, hash identifiers, creation dates, etc. The content of the files may or may not be sent with the first metadata. If the content of the files is not sent to server computing device 108 by the initiating endpoint device, target endpoint device 104b may request the content of the files from the initiating endpoint device. In an operation 802, the first metadata is saved by server computing device 108, for example, in computer-readable medium 304 or in database 110.

In an operation 804, second metadata is received from source endpoint device 104a, which may be any endpoint device at which the synchronized folder was replicated. The second metadata may be generated as a result of an interaction by the user at source endpoint device 104a. In an operation 806, the second metadata is saved by server computing device 108, for example, in computer-readable medium 304 or in database 110.

In an operation 808, the second metadata is compared to the first metadata. Based on the comparison, any added files are identified in an operation 810. For example, any file having a filename that is included in the second metadata and not in the previous metadata may be identified as an added file. Based on the comparison, any deleted files are identified in an operation 812. For example, any file having a filename that is included in the first metadata and not in the second metadata may be identified as a deleted file. Based on the comparison, any modified files are identified in an operation 814. For example, any file having the same filename in the second metadata and in the first metadata, but a different value for the hash identifier may be identified as a modified file. Based on the comparison, any added folders are identified in an operation 816. For example, any folder having a folder name that is included in the second metadata and not in the first metadata may be identified as an added folder. Based on the comparison, any deleted folders are identified in an operation 818. For example, any folder having a folder name that is included in the first metadata and not in the second metadata may be identified as a deleted folder. Operations 810-818 may be performed in any order.

In an operation 822, the hash identifier associated with each of the identified added files is compared to the hash identifier associated with each of the identified deleted files. In an operation 824, a determination is made for any of the hash identifiers that match between the identified added files and the identified deleted files. If no hash identifiers match between the identified added files and the identified deleted files, processing continues at an operation 838. For those files for which the hash identifiers match, processing continues at an operation 826 to determine if the files are renamed and/or moved files.

In operation 826, the filenames of the added file and the deleted file having matching hash identifiers are compared. In an operation 828, a determination is made concerning whether or not the filenames match. If the filenames match, processing continues at an operation 832. If the filenames do not match, processing continues at an operation 830. In operation 830, information associated with the file is added to a list of renamed files and the file is identified as a renamed file. The information may include the new or current filename of the file identified as an added file, the previous filename of the file identified as a deleted file, and the hash identifier. The information may be stored in any type of data structure. Files identified as renamed are removed from the list of added and deleted files.

In operation 832, the parent folder name of the added file and the deleted file having matching hash identifiers are compared. In an operation 834, a determination is made concerning whether or not the parent folder names match. If the parent folder names match, processing continues at operation 838. If the parent folder names do not match, processing continues at an operation 836. In operation 836, information associated with the file is added to a list of moved files and the file is identified as a moved file. The information may include the new or current parent folder name of the file identified as an added file, the previous parent folder name of the file identified as a deleted file, and the hash identifier. The list of renamed files and moved files may be the same list and may include the new filename of the file identified as an added file, the previous filename of the file identified as a deleted file, the new parent folder name of the file identified as an added file, the previous parent folder name of the file identified as a deleted file, and the hash identifier. Files identified as moved are removed from the list of added and deleted files. The list of renamed files and moved files may or may not include the previous filename of the file identified as a deleted file or the previous parent folder name of the file identified as a deleted file. Instead, target endpoint device 104b may determine the matching file using the hash identifier locally.

Operations 826-836 are performed for each file that has a matching hash identifier in the identified added files and the identified deleted files. When each file having matching hash identifiers has been processed, processing continues at operation 838. Operations 826, 828, and 830 may be performed either before or after operations 832, 834, and 836.

In operation 838, the second metadata is saved to replace the first metadata for subsequent comparisons initiated by receipt of a subsequent second metadata in operation 804 from any endpoint device at which the synchronized folder was replicated.

In operations 840-852, one or more subsets of the created second metadata are communicated to target endpoint device 104b, which may be any endpoint device at which the synchronized folder was replicated. Operations 840-852 are similar to those described with reference to operations 440-452 of FIG. 4 except that server computing device 108 is communicating the one or more subsets of the created second metadata to target endpoint device 104b instead of source endpoint device 104a.

In an alternative embodiment, synchronization controller application 310 executing at server computing device 108 may perform some or all of the operations described with reference to FIG. 7 by receiving the metadata from source endpoint device 104a. In the alternative embodiment, synchronization controller application 310 executing at server computing device 108 then may perform some or all of operations 840-852 described with reference to FIG. 8 by sending the metadata to target endpoint device 104b. Thus, the distribution of the operations among source endpoint device 104a, target endpoint device 104b, and server computing device 108 described in FIGS. 4, 6, 7, and 8 may be different in various embodiments.

The word "illustrative" is used herein to mean serving as an illustrative, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. At least one computer storage device storing computer-executable instructions that, when executed by a computing device, cause the computing device to:
   create current metadata for a synchronized folder, wherein the synchronized folder includes a plurality of files that are replicated at a second computing device, wherein the created current metadata includes a filename and a hash identifier for each file of the plurality of files, wherein the hash identifier is calculated based on the contents of a respective file of the plurality of files, wherein the created current metadata further includes a parent folder name for each file of the plurality of files;
   compare the created current metadata to previous metadata created for the synchronized folder;
   based on the comparison, identify a first file added to the synchronized folder after creation of the previous metadata;
   based on the comparison, identify a second file deleted from the synchronized folder after creation of the previous metadata;
   compare the hash identifier of the identified first file to the hash identifier of the identified second file;
   compare the filename of the identified first file to the filename of the identified second file when the hash identifier of the identified first file matches the hash identifier of the identified second file;
   identify the first file as a renamed file when the filename of the identified first file does not match the filename of the identified second file;
   compare the parent folder name of the identified first file to the parent folder name of the identified second file when the hash identifier of the identified first file matches the hash identifier of the identified second file;
   identify the first file as a moved file and send the filename and the parent folder name of the identified first file to the second computing device when the parent folder name of the identified first file does not match the parent folder name of the identified second file; and
   send the parent folder name and the filename of the identified first file to the second computing device when the parent folder name of the identified first file does not match the parent folder name of the identified second file.

2. The at least one computer storage device of claim 1, wherein the computer-readable instructions further cause the computing device to send the filename and the hash identifier of the identified first file to the second computing device when the filename of the identified first file does not match the filename of the identified second file.

3. The at least one computer storage device of claim 1, wherein the computer-readable instructions further cause the computing device to send the filename and the hash identifier of the identified first file to a third computing device when the filename of the identified first file does not match the filename of the identified second file, and further wherein the third computing device is a server computing device.

4. The at least one computer storage device of claim 1, wherein the computer-readable instructions further cause the computing device to send the hash identifier of the identified first file to the second computing device.

5. The at least one computer storage device of claim 1, wherein the computer-readable instructions further cause the computing device to send the parent folder name and the filename of the identified first file to a third computing device when the parent folder name of the identified first file does not match the parent folder name of the identified second file, and further wherein the third computing device is a server computing device.

6. At least one computer storage device storing computer-executable instructions that, when executed by a computing device, cause the computing device to perform a method comprising:
   identify a first file as a renamed file in a synchronized folder, wherein the synchronized folder includes a file that is replicated at a second computing device;
   identify a first folder added to the synchronized folder, wherein the synchronized folder includes further a plurality of folders that are replicated at the second computing device;
   identify a second folder deleted from the synchronized folder;
   send a filename of the identified first file to the second computing device when the filename does not match that of an identified another file;
   send first metadata associated with the identified first folder to a third computing device, wherein the first metadata includes a first folder name of the identified first folder;
   after sending the first metadata, send second metadata associated with the identified first file to the third computing device, wherein the second metadata includes a first filename of the identified first file and an identifier to identify the renamed file at the second computing device; and
   after sending the second metadata, send third metadata associated with the identified second folder to the third computing device, wherein the third metadata includes a second folder name of the identified second folder.

7. The at least one computer storage device of claim 6, wherein the second computing device and the third computing device are the same computing device.

8. The at least one computer storage device of claim 6, wherein the computer-readable instructions further cause the computing device to identify a second file deleted from the synchronized folder and to send fourth metadata associated with the identified second file to the third computing device before sending the first metadata, wherein the fourth metadata includes a second filename of the identified second file.

9. The at least one computer storage device of claim 8, wherein the computer-readable instructions further cause the computing device to identify a third file added to the synchronized folder and to send fifth metadata associated with the identified third file to the third computing device after sending the third metadata, wherein the fifth metadata includes a third filename of the identified third file.

10. The at least one computer storage device of claim 6, wherein the computer-readable instructions further cause the computing device to identify a second file added to the synchronized folder and to send fourth metadata associated with the identified second file to the third computing device after sending the third metadata, wherein the fourth metadata includes a second filename of the identified second file.

11. The at least one computer storage device of claim 6, wherein the computer-readable instructions further cause the computing device to identify a second file as a moved file in the synchronized folder and to send fourth metadata associated with the identified second file to the third computing device after sending the first metadata and before sending the third metadata, wherein the fourth metadata includes a parent folder name of the second file.

12. The at least one computer storage device of claim 11, wherein the fourth metadata further includes a second filename of the identified second file.

13. The at least one computer storage device of claim 11, wherein the first file and the second file are the same file.

14. The at least one computer storage device of claim 6, wherein the first filename is a current filename of the identified first file and the identifier includes at least one of a hash identifier calculated based on the contents of the identified first file and a previous filename of the identified first file.

15. At least one computer storage device storing computer-executable instructions that, when executed by a computing device, cause the computing device to perform a method comprising:
   create current metadata for a synchronized folder, wherein the synchronized folder includes a plurality of files that are replicated at a second computing device, wherein the created current metadata includes a filename and a hash identifier for each file of the plurality of files, wherein the hash identifier is calculated based on the contents of a respective file of the plurality of files;
   compare the created current metadata to previous metadata created for the synchronized folder;
   based on the comparison, identify a first file added to the synchronized folder after creation of the previous metadata;
   based on the comparison, identify a second file deleted from the synchronized folder after creation of the previous metadata;
   compare the hash identifier of the identified first file to the hash identifier of the identified second file;
   compare the filename of the identified first file to the filename of the identified second file when the hash identifier of the identified first file matches the hash identifier of the identified second file;
   identify a first folder added to the synchronized folder, wherein the synchronized folder further includes a plurality of folders that are replicated at the second computing device;
   identify a second folder deleted from the synchronized folder;
   send a filename of the identified first file to the second computing device when the filename does not match that of an identified another file;
   send first metadata associated with the identified first folder to a third computing device, wherein the first metadata includes a first folder name of the identified first folder;
   after sending the first metadata, send second metadata associated with the identified first file to the third computing device when the filename of the identified first file does not match the filename of the identified second file, wherein the second metadata includes a first filename of the identified first file and an identifier to identify the renamed file at the second computing device; and
   after sending the second metadata, send third metadata associated with the identified second folder to the third computing device, wherein the third metadata includes a second folder name of the identified second folder.

16. The at least one computer storage device of claim 15, wherein the first filename is a current filename of the identified first file and further wherein the identifier includes at least one of the hash identifier of the identified first file and a previous filename of the identified first file.

17. The at least one computer storage device of claim 15, wherein the created current metadata further includes a parent folder name for each file of the plurality of files, and further wherein the computer-readable instructions further cause the computing device to compare the parent folder name of the identified first file to the parent folder name of the identified second file when the hash identifier of the identified first file matches the hash identifier of the identified second file.

18. The at least one computer storage device of claim 17, wherein the second metadata further includes the parent folder name of the identified first file when the parent folder name of the identified first file does not match the parent folder name of the identified second file.

* * * * *